United States Patent
Furuta

(10) Patent No.: US 10,449,822 B2
(45) Date of Patent: Oct. 22, 2019

(54) SUSPENSION CONTROL SYSTEM

(71) Applicant: TOYOTA JIDOSHA KABUSHIKI KAISHA, Toyota-shi, Aichi-ken (JP)

(72) Inventor: Hiroki Furuta, Toki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/027,912

(22) Filed: Jul. 5, 2018

(65) Prior Publication Data
US 2019/0009631 A1 Jan. 10, 2019

(30) Foreign Application Priority Data

Jul. 6, 2017 (JP) ................................. 2017-132927

(51) Int. Cl.
*B60G 17/018* (2006.01)
*B60G 17/015* (2006.01)
(Continued)

(52) U.S. Cl.
CPC ..... *B60G 17/01908* (2013.01); *B60G 17/018* (2013.01); *B60G 17/08* (2013.01);
(Continued)

(58) Field of Classification Search
CPC ...... B60G 17/06; B60G 17/08; B60G 17/015; B60G 17/016; B60G 17/018; B60G 2800/91; B60G 2800/916; B60G 2500/10
(Continued)

(56) References Cited

U.S. PATENT DOCUMENTS

| 5,425,436 | A | * | 6/1995 | Teramura | B60G 17/018 |
| | | | | | 188/266.1 |
| 5,488,556 | A | * | 1/1996 | Sasaki | B60G 17/0152 |
| | | | | | 280/5.517 |

(Continued)

FOREIGN PATENT DOCUMENTS

| JP | 2016-002778 A | 1/2016 |
| JP | 2016-002844 A | 1/2016 |

OTHER PUBLICATIONS

Control algorithms of inelastic resistance forces of hydropneumatic springs; A. V. Pokhlebin ; A. V. Pozdeev ; I. A. Golyatkin; 2016 2nd International Conference on Industrial Engineering, Applications and Manufacturing (ICIEAM); pp. 1-6. (Year: 2016).*

(Continued)

Primary Examiner — Cuong H Nguyen
(74) Attorney, Agent, or Firm — Sughrue Mion, PLLC

(57) ABSTRACT

A suspension control system includes: a suspension, a damping force of which fluctuates in accordance with a control amount; and a control unit controlling the damping force by determining the control amount. The control unit executes a control amount correction process of determining the control amount by combining a base control amount and a correction control amount. The control unit executes the control amount correction process such that the damping force becomes smaller than a base damping force regardless of a stroke speed in the case where a requested damping direction is an upward direction, and executes the control amount correction process such that the damping force becomes larger than the base damping force regardless of the stroke speed in the case where the requested damping direction is a downward direction.

6 Claims, 10 Drawing Sheets

(51) Int. Cl.
  *B60G 17/019* (2006.01)
  *B60G 17/08* (2006.01)
(52) U.S. Cl.
  CPC .. *B60G 2400/102* (2013.01); *B60G 2400/202* (2013.01); *B60G 2400/204* (2013.01); *B60G 2500/10* (2013.01); *B60G 2600/184* (2013.01); *B60G 2800/916* (2013.01)
(58) Field of Classification Search
  USPC .................. 701/37–38, 48; 280/5.507, 5.515
  See application file for complete search history.

(56) References Cited

U.S. PATENT DOCUMENTS

| | | | | |
|---|---|---|---|---|
| 5,490,068 | A * | 2/1996 | Shimizu | B60G 17/018 |
| | | | | 280/5.504 |
| 5,890,081 | A * | 3/1999 | Sasaki | B60G 17/018 |
| | | | | 701/37 |
| 5,935,181 | A * | 8/1999 | Iwasaki | B60G 17/0164 |
| | | | | 701/37 |
| 6,434,460 | B1 * | 8/2002 | Uchino | B60G 17/01933 |
| | | | | 180/902 |
| 2002/0032508 | A1 * | 3/2002 | Uchino | B60G 17/01933 |
| | | | | 701/37 |
| 2012/0046829 | A1 * | 2/2012 | Ogawa | B60G 17/016 |
| | | | | 701/37 |
| 2012/0053791 | A1 * | 3/2012 | Harada | B60G 17/08 |
| | | | | 701/38 |
| 2014/0005889 | A1 * | 1/2014 | Hayakawa | B60G 17/01933 |
| | | | | 701/38 |
| 2015/0066295 | A1 * | 3/2015 | Kanda | B60G 17/06 |
| | | | | 701/38 |
| 2017/0072762 | A1 * | 3/2017 | Kurita | B60G 17/015 |
| 2017/0267049 | A1 * | 9/2017 | Kubota | B60G 17/015 |

OTHER PUBLICATIONS

Multi-agent Integrated Control on Vehicle Semi-active Suspension and EPS; Limin Niu ; Youqun Zhao ; Fen Lin2009 WRI Global Congress on Intelligent Systems; vol. 1, pp. 75-79. (Year: 2009).*
Ride comfort quality improvement for a quarter car semi-active suspension system via state-feedback controllerFitri Yakub ; Pauziah Muhammad ; Zul Hilmi Che Daud ; Abdul Yasser Abd Fatah ; Yasuchika Mori2017 11th Asian Control Conference (ASCC); pp. 406-411. (Year: 2017).*
Modeling the dynamic suspension behavior of an eddy current device; Nirmal Paudel ; Jonathan Z. Bird ; Subhra Paul ; Dheeraj Bobba; 2011 IEEE Energy Conversion Congress and Exposition; pp. 1692-1699. (Year: 2011).*

* cited by examiner

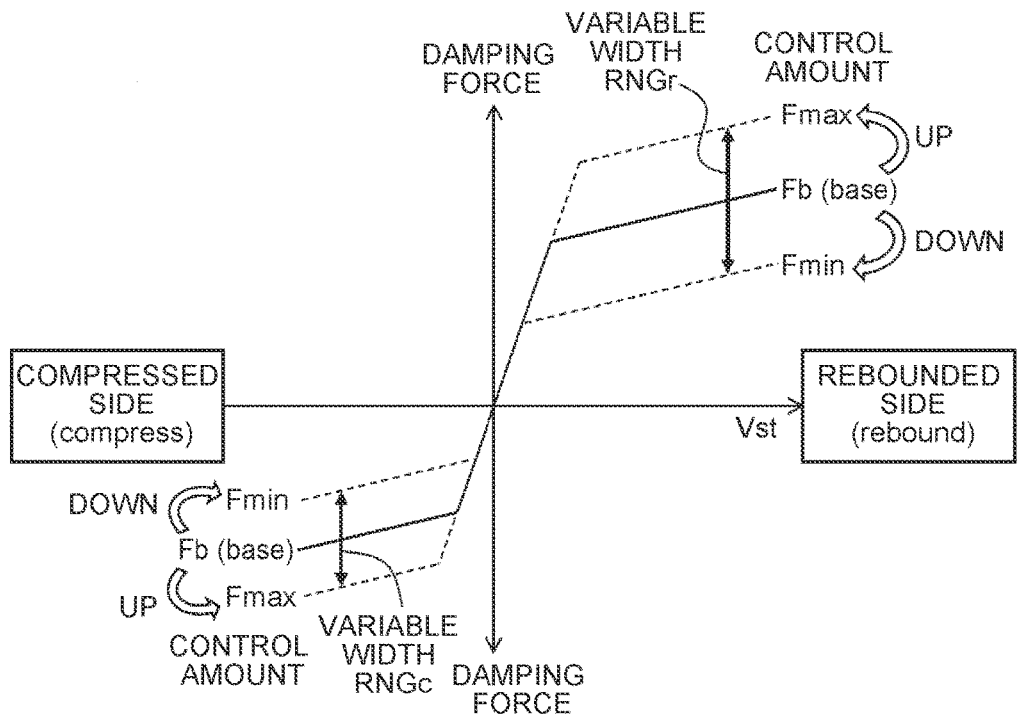

SUSPENSION CONTROL SYSTEM

INCORPORATION BY REFERENCE

The disclosure of Japanese Patent Application No. 2017-132927 filed on Jul. 6, 2017 including the specification, drawings and abstract is incorporated herein by reference in its entirety.

BACKGROUND

1. Technical Field

The disclosure relates to a suspension control system that controls a damping force of a suspension for a vehicle.

2. Description of Related Art

A suspension system for a vehicle is disclosed in Japanese Patent Application Publication No. 2016-002778 (JP 2016-002778 A). In the suspension system, a damping force of a shock absorber in a suspension can be increased or reduced by increasing or reducing a control current. Specific damping force control is as will be described below.

First, the suspension system calculates a base control current in accordance with a vehicle speed. Next, in order to suppress vertical vibrations of a sprung structure, the suspension system executes a correction process to add a correction value to the base control current or subtract the correction value from the base control current. A final control current is determined by this correction process.

In the above correction process, whether to add or subtract the correction value, that is, whether to increase or reduce the control current from the base control current is determined by a relationship between a "sprung speed" and a "stroke speed". The sprung speed is a vertical speed of the sprung structure at a wheel position and has a positive value in an upward direction. The stroke speed is a relative speed between the sprung structure and an unsprung structure that are mutually coupled via the suspension. The stroke speed has a positive sign on a "rebounded side" and a negative sign on a "compressed side".

In the case where the sprung speed and the stroke speed have the same sign, the suspension system adds the correction value to the base control current, that is, increases the control current from the base control current. On the other hand, in the case where the sprung speed and the stroke speed have the opposite signs, the suspension system subtracts the correction value from the base control current, that is, reduces the control current from the base control current.

A stroke speed estimation device for estimating the stroke speed is disclosed in Japanese Patent Application Publication No. 2016-002844 (JP 2016-002844 A). The stroke speed estimation device estimates the stroke speed on the basis of vertical acceleration of the sprung structure. The vertical acceleration of the sprung structure is detected by a sprung acceleration sensor that is mounted on the sprung structure. A plant model and an observer are used in a stroke speed estimation process. The plant model and the observer are defined on the basis of a state space of an equation of motion that is based on a single-wheel, two-degree-of-freedom model.

SUMMARY

As described above, according to the technique disclosed in JP 2016-002778 A, whether to increase or reduce the control current from the base control current in the correction process is determined by the relationship between the "sprung speed" and the "stroke speed". More specifically, in the case where the sprung speed and the stroke speed have the same sign, the control current is corrected so as to be increased from the base control current. On the other hand, in the case where the sprung speed and the stroke speed have the opposite signs, the control current is corrected so as to be reduced from the base control current. Accordingly, it is required to switch an increase/reduction (UP/DOWN) of the control current every time the sign of the sprung speed or the stroke speed is reversed.

In general, the stroke speed fluctuates at a higher frequency than the sprung speed. For example, while the frequency of the sprung speed is approximately 1 to 2 Hz, the frequency of the stroke speed is approximately 10 to 15 Hz. Accordingly, the stroke speed exerts a strong influence on switching between the increase/reduction (UP/DOWN) of the control current. In other words, it is required to switch the increase/reduction (UP/DOWN) of the control current in a synchronized manner with reversal of the high-frequency stroke speed.

However, an actuator for changing the damping force of the shock absorber has limited response performance. In addition, as described in above JP 2016-002844 A, a complicated process is required to estimate the stroke speed, and thus certain duration is required for the estimation process. For these reasons, switching between the increase/reduction (UP/DOWN) of the control current, which is synchronized with the reversal of the sign of the stroke speed, is not always easy, and a control delay tends to occur. In the case where the increase/reduction (UP/DOWN) of the control current cannot be switched in the synchronized manner with the reversal of the sign of the stroke speed, that is, in the case where the control delay occurs, desired damping force control performance cannot be obtained. This possibly leads to degraded reliability of the system.

The disclosure provides a technique capable of preventing a control delay in a suspension control system that controls a damping force of a suspension.

A suspension control system according to an aspect of the disclosure is mounted on a vehicle and includes: a suspension that is provided for a wheel of the vehicle and a damping force of which fluctuates in accordance with a control amount; and a control unit configured to determine the control amount and control the damping force. The control unit is configured to execute a base calculation process of calculating a base control amount that is a base value of the control amount and a control amount correction process of determining the control amount by combining the base control amount and a correction control amount. A base damping force is the damping force that corresponds to the base control amount. A stroke speed is a relative speed between a sprung structure and an unsprung structure that are mutually coupled via the suspension. A requested damping direction is a direction of the damping force that is requested to suppress vibrations of the sprung structure. The control unit is configured to execute the control amount correction process such that the damping force becomes smaller than the base damping force regardless of the stroke speed in the case where the requested damping direction is an upward direction and to execute the control amount correction process such that the damping force becomes larger than the base damping force regardless of the stroke speed in the case where the requested damping direction is a downward direction.

In the above aspect, when a compressed side and a rebounded side of the stroke speed are compared, fluctuation width of the damping force with respect to a fluctuation of the control amount may be greater on the rebounded side than on the compressed side.

In the above aspect, a sprung speed may be a vertical speed of the sprung structure. The requested damping direction may be the downward direction in the case where the sprung speed is in the upward direction, and the requested damping direction may be the upward direction in the case where the sprung speed is in the downward direction.

In the above aspect, a sprung acceleration sensor that detects vertical acceleration of the sprung structure may further be provided. The control unit may be configured to calculate a requested control amount that is requested to suppress the vibrations of the sprung structure as the correction control amount on the basis of the vertical acceleration detected by the sprung acceleration sensor.

In the above aspect, a sign of the correction control amount may differ by whether the requested damping direction is the upward direction or the downward direction, and the control unit may be configured to execute the control amount correction process by combining the correction control amount and the base control amount without determining whether the requested damping direction is the upward direction or the downward direction.

In the above aspect, a sprung acceleration sensor that detects vertical acceleration of the sprung structure may further be provided. The control unit may be configured to determine whether the requested damping direction is the upward direction or the downward direction on the basis of the vertical acceleration detected by the sprung acceleration sensor.

According to this aspect, the stroke speed is not taken into consideration in the control amount correction process of increasing or reducing the control amount from the base control amount. The control amount correction process is executed not on the basis of the stroke speed but on the basis of the requested damping direction. Accordingly, there is no need to switch an increase/reduction (UP/DOWN) of the control amount when the stroke speed is reversed between the rebounded side and the compressed side. The increase/reduction (UP/DOWN) of the control amount is switched only when the requested damping direction is reversed.

The requested damping direction fluctuates at a lower frequency than the stroke speed. According to the aspect, there is no need to switch the increase/reduction (UP/DOWN) of the control amount at the high frequency that is equivalent to the frequency of the stroke speed. Switching between the increase/reduction (UP/DOWN) of the control amount at the relatively low frequency suffices. In other words, the control amount correction process according to the disclosure is less likely to be affected by response performance of an actuator for changing the damping force of a shock absorber. Thus, in the control amount correction process according to the disclosure, a control delay of damping force control is less likely to occur.

In addition, since the stroke speed is not taken into consideration in the control amount correction process, there is no need to estimate the stroke speed. As described in Patent Literature 2 (JP 2016-002844 A), the complicated process is generally required to estimate the stroke speed, and thus significantly long calculation duration and a significant calculation load are required for the estimation process. However, since such a complicated estimation process is unnecessary in the disclosure, a speed of the control amount correction process is improved. This also contributes to reduction of the control delay. Furthermore, since the estimation process of the stroke speed is unnecessary, a system configuration can be simplified.

As it has been described so far, according to the disclosure, the control delay of the damping force control is less likely to occur. Thus, the damping force control can be executed as desired. This contributes to improved reliability of the system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a graph representing a characteristic of a damping force of the suspension according to the embodiment of the disclosure;

FIG. 4 is a table summarizing a control amount correction process according to a comparative example;

DETAILED DESCRIPTION OF EMBODIMENTS

An embodiment of the disclosure will be described with reference to the accompanying drawings.

Figure 1:
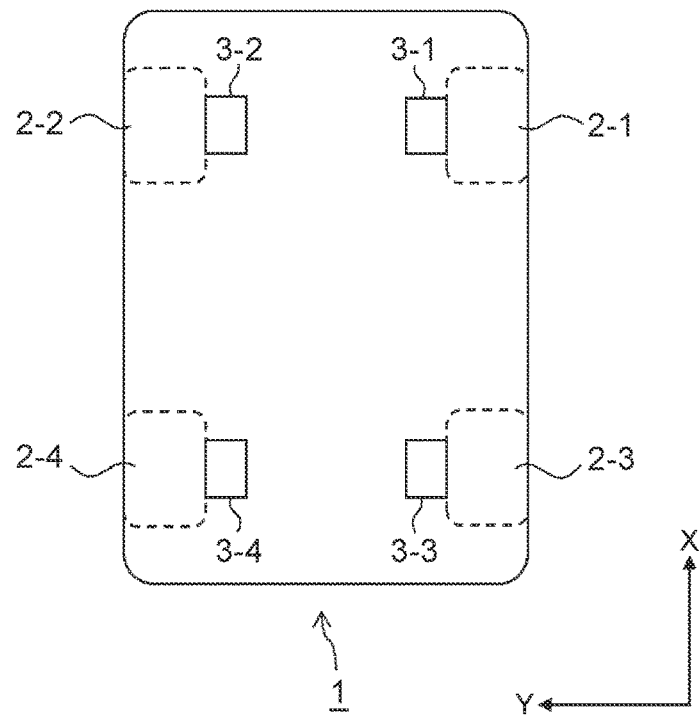
FIG. 1 is a schematic view illustrating a vehicle according to an embodiment of the disclosure.

Variable Damping Force Suspension FIG. 1 is a schematic view illustrating a vehicle 1 according to the embodiment of the disclosure. The vehicle 1 includes wheels 2 and suspensions 3. The wheels 2 include a right-front wheel 2-1, a left-front wheel 2-2, a right-rear wheel 2-3, and a left-rear wheel 2-4. The suspension 3 is provided for each of the wheels 2. More specifically, a first suspension 3-1, a second suspension 3-2, a third suspension 3-3, and a fourth suspension 3-4 are respectively provided for the right-front wheel 2-1, the left-front wheel 2-2, the right-rear wheel 2-3, and the left-rear wheel 2-4.

Figure 2:
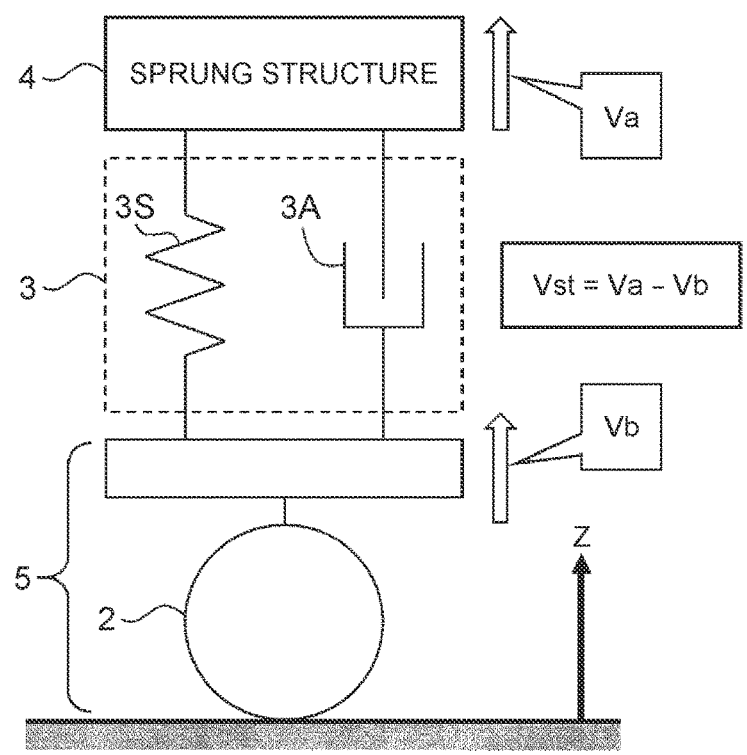
FIG. 2 is a conceptual view illustrating a suspension of the vehicle according to the embodiment of the disclosure.

FIG. 2 is a conceptual view illustrating the suspension 3 according to this embodiment. In FIG. 2, the suspension 3 that is provided for the certain wheel 2 is conceptually shown. The suspension 3 is provided in such a manner as to couple a sprung structure 4 and an unsprung structure 5 of the vehicle 1 (the unsprung structure 5 includes the wheel 2). In detail, the suspensions 3 includes a spring 3S and a shock absorber 3A, and those spring 3S and shock absorber 3A are provided in parallel between the sprung structure 4 and the unsprung structure 5.

Here, definitions of terms used in the following description will be provided. A Z-direction is an upward direction of the vehicle 1. A "sprung speed Va" is a vertical speed of the sprung structure 4. An "unsprung speed Vb" is a vertical speed of the unsprung structure 5. The sprung speed Va and the unsprung speed Vb each have a positive sign in the upward direction and have a negative sign in a downward direction. A "stroke speed Vst" is a relative speed between the sprung structure 4 and the unsprung structure 5 that are mutually coupled via the suspension 3, and is defined as "Vst=Va−Vb". If Va>Vb, the suspension 3 is rebounded. If Va<Vb, the suspension 3 is compressed. That is, the stroke speed Vst has the positive sign on the "rebounded side" and has the negative sign on the "compressed side". In the following description, a "damping force of the shock absorber 3A in the suspension 3" will simply be referred to as a "damping force of the suspension 3".

FIG. 3 is a graph representing a damping force characteristic of the suspensions 3 in this embodiment. A horizontal axis represents the stroke speed Vst, and a vertical axis represents the damping force. As shown in FIG. 3, the damping force of the suspension 3 is changed in accordance with the stroke speed Vst. In detail, the damping force of the suspension 3 is increased as an absolute value of the stroke speed Vst is increased. Note that, in general, the suspension 3 is designed such that the damping force on the rebounded side becomes larger than the damping force on the compressed side when the damping force is compared at the same absolute value of the stroke speed Vst.

In this embodiment, the damping force characteristic of the suspension 3 is variable. Any mechanism that varies the damping force characteristic of the suspension 3 can be adopted. For example, a mechanism as disclosed in Patent Literature 1 (JP 2016-002778 A) may be used. In this case, the damping force characteristic can be controlled by controlling a control current that is supplied to a solenoid provided in the shock absorber 3A. In the following description, a parameter such as the control current that is used to control the damping force characteristic of the suspension 3 will be referred to as a "control amount Fa".

In an example shown in FIG. 3, the damping force of the suspension 3 can further be increased by increasing the control amount Fa. Meanwhile, the damping force of the suspension 3 can further be reduced by reducing the control amount Fa. However, a relationship between an increase/reduction of the control amount Fa and an increase/reduction of the damping force depends on the design. Contrary to the example shown in FIG. 3, it may be designed that the damping force is increased (reduced) as the control amount Fa is reduced (increased). In the following description, the relationship between the increase/reduction of the control amount Fa and the increase/reduction of the damping force will be the same as that in the example shown in FIG. 3.

A variable range of the control amount Fa is predetermined, and an upper limit and a lower limit of the variable range are Fmax and Fmin, respectively. That is, the control amount Fa can fluctuate within a range between the upper limit Fmax and the lower limit Fmin.

As shown in FIG. 3, variable width RNG of the damping force of the suspension 3 corresponds to variable width (Fmax−Fmin) of the control amount Fa. In particular, the variable width of the damping force is RNGr in the case where the stroke speed Vst is on the rebounded side, and the variable width of the damping force is RNGc in the case where the stroke speed Vst is on the compressed side. Here, it is preferred that the variable width RNGr on the rebounded side is greater than the variable width RNGc on the compressed side. This means that fluctuation width (sensitivity) of the damping force with respect to a fluctuation of the control amount Fa is greater on the rebounded side than on the compressed side.

The control amount Fa is expressed by a combination of a base control amount Fb and a correction value from the base control amount Fb. The base control amount Fb is a base value of the control amount Fa and is a control amount used to generate a "base damping force". For example, the base control amount Fb is calculated in accordance with a speed of the vehicle 1. The correction value is a control amount that is requested to efficiently suppress vibrations of the sprung structure 4. For example, the correction value is calculated on the basis of the Skyhook damper control theory.

The final control amount Fa is determined by adding the correction value to the base control amount Fb or subtracting the correction value from the base control amount Fb. In other words, the control amount Fa is corrected to be increased or reduced from the base control amount Fb. In the example shown in FIG. 3, the damping force can be increased from the base damping force by correcting the control amount Fa to be increased from the base control amount Fb. Meanwhile, the damping force can be reduced from the base damping force by correcting the control amount Fa to be reduced from the base control amount Fb.

A process of increasing or reducing the control amount Fa from the base control amount Fb will hereinafter be referred to as a "control amount correction process". Hereinafter, in order to facilitate understanding of the control amount correction process according to this embodiment, this embodiment is contrasted with a comparative example.

Control Amount Correction Process in Comparative Example First, as the comparative example, a method disclosed in above Patent Literature 1 (JP 2016-002778 A) will be considered. According to the comparative example, whether to increase or reduce the control amount Fa from the base control amount Fb is determined by a relationship between the "sprung speed Va" and the "stroke speed Vst".

FIG. 4 summarizes the control amount correction process according to the comparative example. In detail, FIG. 4 shows the increase/reduction (UP/DOWN) of the control amount Fa for each combination of the sprung speed Va and the stroke speed Vst.

For example, in the cases where the sprung speed Va is in the upward direction (Va>0) and the stroke speed Vst is on the rebounded side (Vst>0), a "damping effect" to suppress the vertical vibrations of the sprung structure 4 is exerted. Accordingly, in the cases where the sprung speed Va is in the upward direction and the stroke speed Vst is on the rebounded side (Va>0 and Vst>0), in order to further promote the damping effect, the control amount Fa is corrected to be increased from the base control amount Fb (CONTROL AMOUNT UP). The same applies to a case where the sprung speed Va is in the downward direction and the stroke speed Vst is on the compressed side (Va<0 and Vst<0).

Meanwhile, in the cases where the sprung speed Va is in the upward direction (Va>0) and the stroke speed Vst is on the compressed side (Vst<0), a "vibrating effect" to promote the vertical vibrations of the sprung structure 4 is exerted. Accordingly, in the cases where the sprung speed Va is in the upward direction and the stroke speed Vst is on the compressed side (Va>0 and Vst<0), in order to suppress the vibrating effect, the control amount Fa is corrected to be reduced from the base control amount Fb (CONTROL AMOUNT DOWN). The same applies to a case where the sprung speed Va is in the downward direction and the stroke speed Vst is on the rebounded side (Va<0 and Vst>0).

Figure 5:
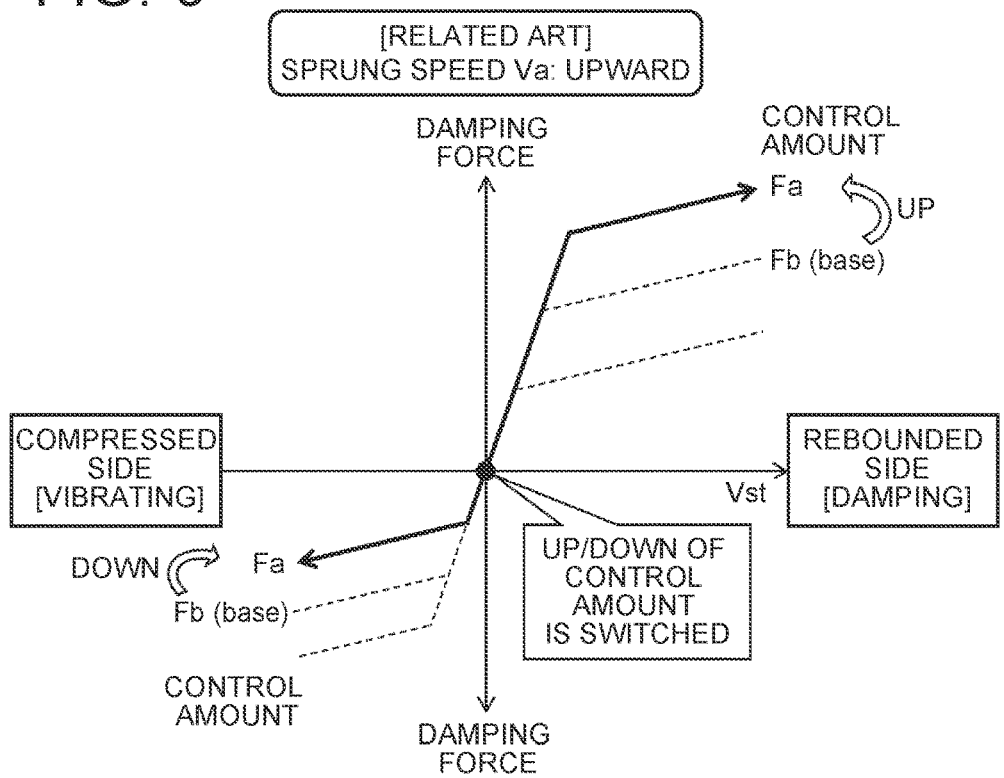
FIG. 5 is a conceptual graph illustrating the control amount correction process according to the comparative example.
Figure 6:
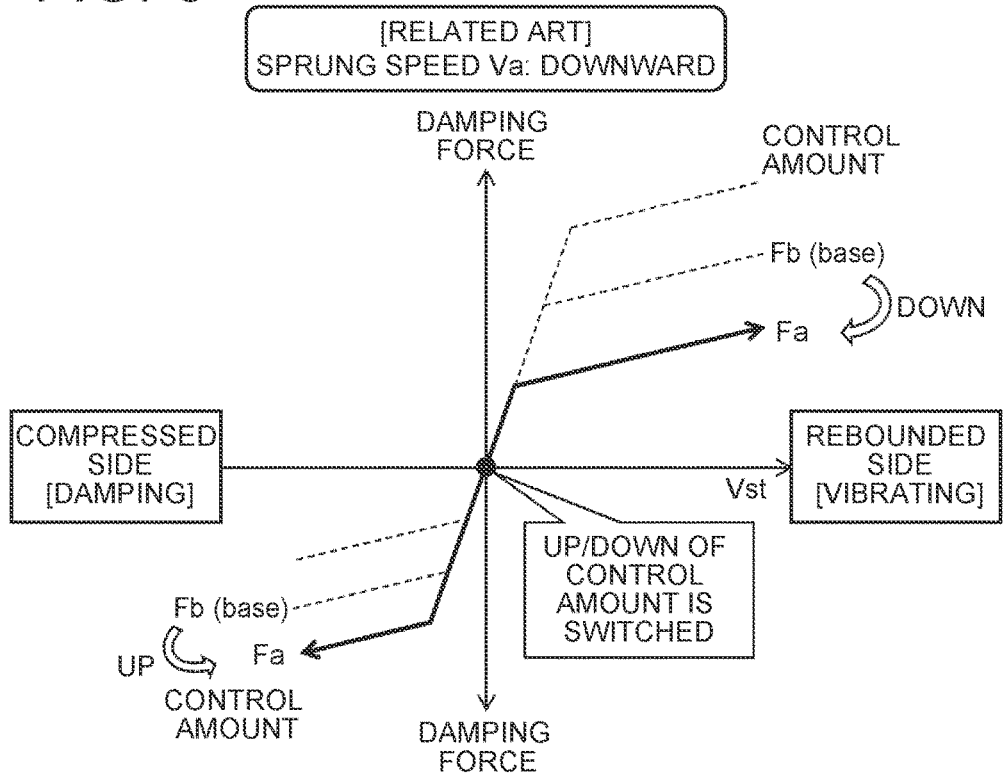
FIG. 6 is a conceptual graph illustrating the control amount correction process according to the comparative example.

FIG. 5 and FIG. 6 each show the control amount correction process according to the comparative example shown in FIG. 4 in the same format as FIG. 3.

FIG. 5 shows a case where the sprung speed Va is in the upward direction (Va>0). In the case where the stroke speed Vst is on the rebounded side (Vst>0), in order to further promote the damping effect, the control amount Fa is corrected to be increased from the base control amount Fb (CONTROL AMOUNT UP). Meanwhile, in the case where the stroke speed Vst is on the compressed side (Vst<0), in order to suppress the vibrating effect, the control amount Fa is corrected to be reduced from the base control amount Fb (CONTROL AMOUNT DOWN). Every time the stroke speed Vst is reversed between the rebounded side and the compressed side, the increase/reduction (UP/DOWN) of the control amount Fa is switched.

FIG. 6 shows a case where the sprung speed Va is in the downward direction (Va<0). In the case where the stroke speed Vst is on the rebounded side (Vst>0), in order to suppress the vibrating effect, the control amount Fa is corrected to be reduced from the base control amount Fb (CONTROL AMOUNT DOWN). Meanwhile, in the case where the stroke speed Vst is on the compressed side (Vst<0), in order to further promote the damping effect, the control amount Fa is corrected to be increased from the base control amount Fb (CONTROL AMOUNT UP). Every time the stroke speed Vst is reversed between the rebounded side and the compressed side, the increase/reduction (UP/DOWN) of the control amount Fa is switched.

Figure 7:
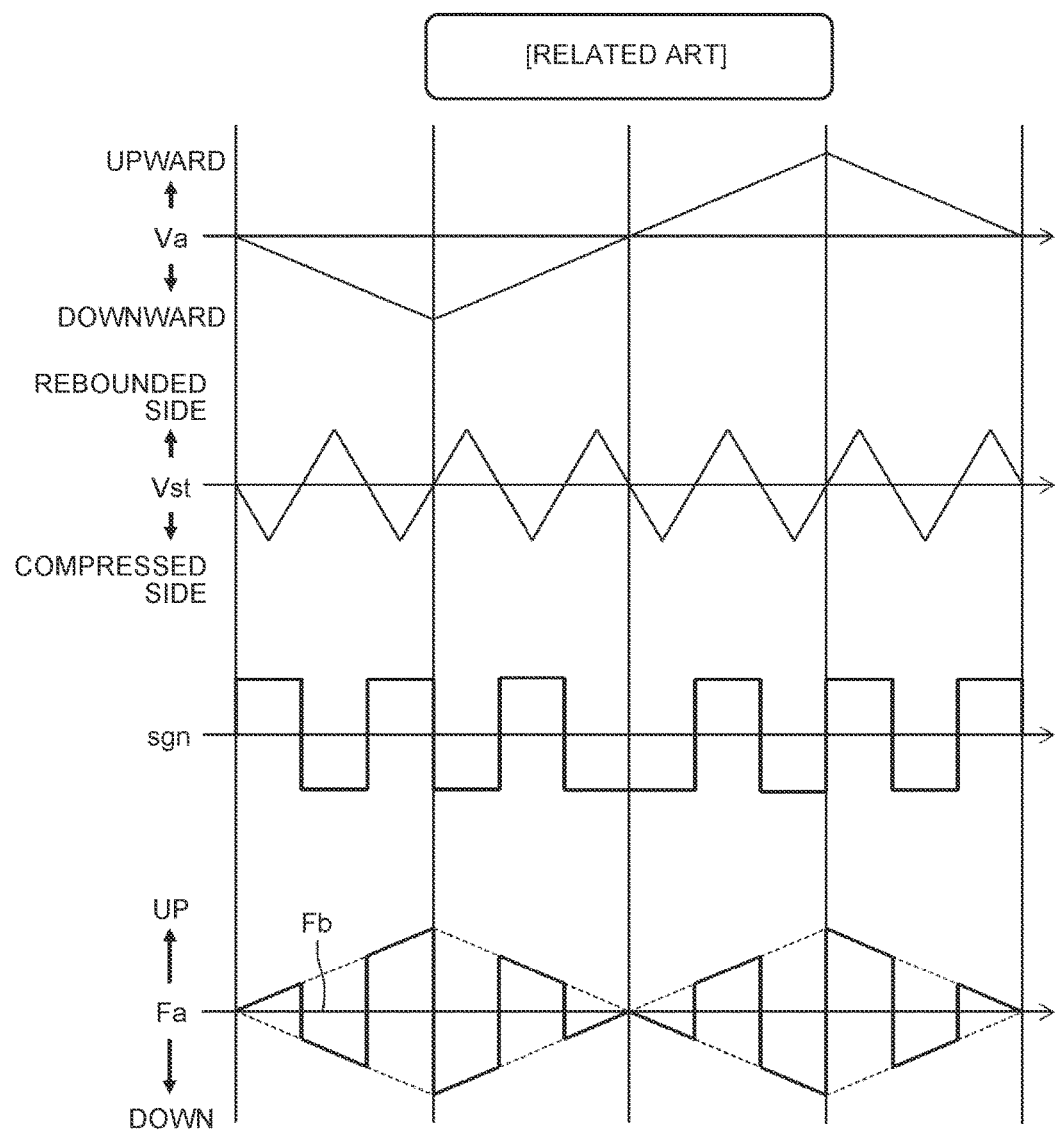
FIG. 7 is a flowchart illustrating the control amount correction process according to the comparative example.

FIG. 7 is a flowchart illustrating the control amount correction process according to the comparative example. FIG. 7 shows an example of temporal changes of the sprung speed Va, the stroke speed Vst, a determination sign sgn, and the control amount Fa. The determination sign sgn indicates whether the sign of the sprung speed Va and the sign of the stroke speed Vst are the same or opposite from each other. In the case where the sign of the sprung speed Va and the sign of the stroke speed Vst are the same, the determination sign sgn has a value "+1". On the other hand, in the case where the sign of the sprung speed Va and the sign of the stroke speed Vst are opposite from each other, the determination sign sgn has a value "−1". The correction value from the base control amount Fb is acquired as a product of the determination sign sgn and an absolute value of the sprung speed Va. That is, the following relational equations are established; $Fa=Fb-sgn\cdot|Va|$, $Fa=Fb+sgn\cdot|Va|$. It is also understood from FIG. 7 that, every time the sign of the stroke speed Vst is reversed, the increase/reduction (UP/DOWN) of the control amount Fa is switched.

As it has been described so far, according to the comparative example, the increase/reduction (UP/DOWN) of the control amount Fa has to be switched every time the stroke speed Vst is reversed between the rebounded side and the compressed side. It should be noted that, as conceptually shown in FIG. 7, the stroke speed Vst fluctuates at a higher frequency than the sprung speed Va. For example, while the frequency of the sprung speed Va is approximately 1 to 2 Hz, the frequency of the stroke speed Vst is approximately 10 to 15 Hz. In the comparative example, it is required to switch the increase/reduction (UP/DOWN) of the control amount Fa in a synchronized manner with the reversal of such a high-frequency stroke speed Vst.

However, an actuator for changing the damping force of the shock absorber 3A has limited response performance. In addition, as described in Patent Literature 2 (JP 2016-002844 A), a complicated process is required to estimate the stroke speed Vst, and thus certain duration is required for the estimation process. For these reasons, switching between the increase/reduction (UP/DOWN) of the control amount Fa, which is synchronized with the reversal of the sign of the stroke speed Vst, is not always easy, and a control delay tends to occur. In the case where the increase/reduction (UP/DOWN) of the control amount Fa cannot be switched in the synchronized manner with the reversal of the sign of the stroke speed Vst, that is, in the case where the control delay occurs, desired damping force control performance cannot be obtained. This leads to degraded reliability of a system.

Control Amount Correction Process in this Embodiment

Next, the control amount correction process according to this embodiment will be described. According to this embodiment, the sign of the stroke speed Vst is not taken into consideration when it is determined whether to increase or reduce the control amount Fa from the base control amount Fb. That is, even when the stroke speed Vst is reversed between the rebounded side and the compressed side, the increase/reduction (UP/DOWN) of the control amount Fa is not switched.

Figure 8:
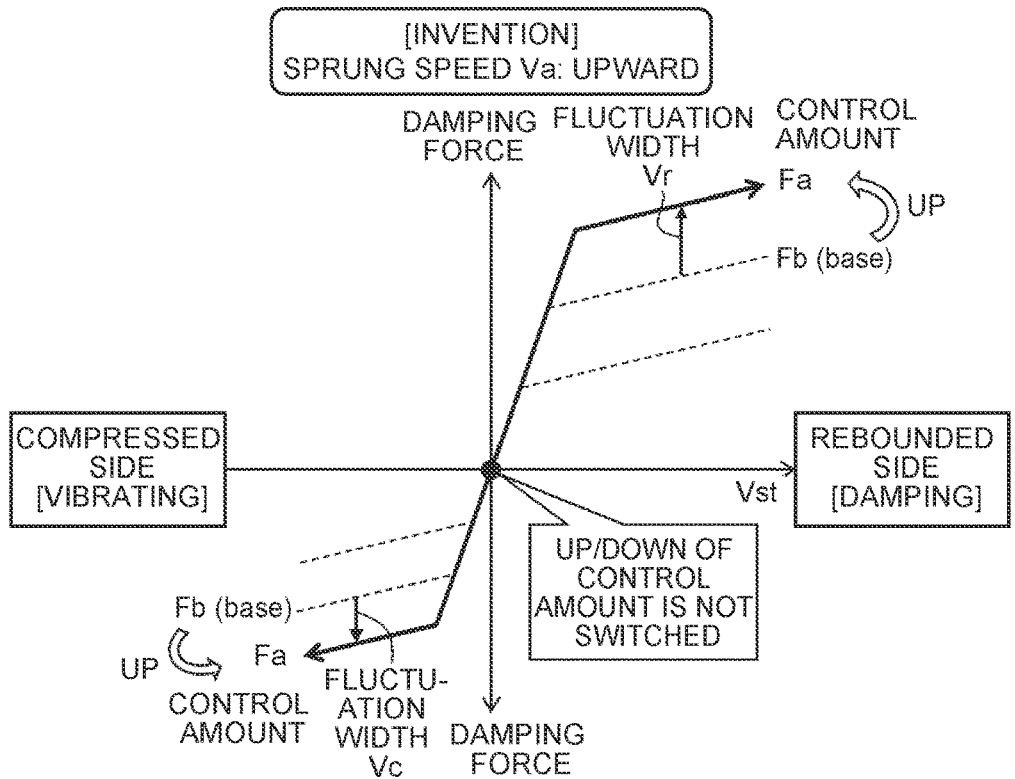
FIG. 8 is a conceptual graph illustrating a control amount correction process according to the embodiment of the disclosure.
Figure 9:
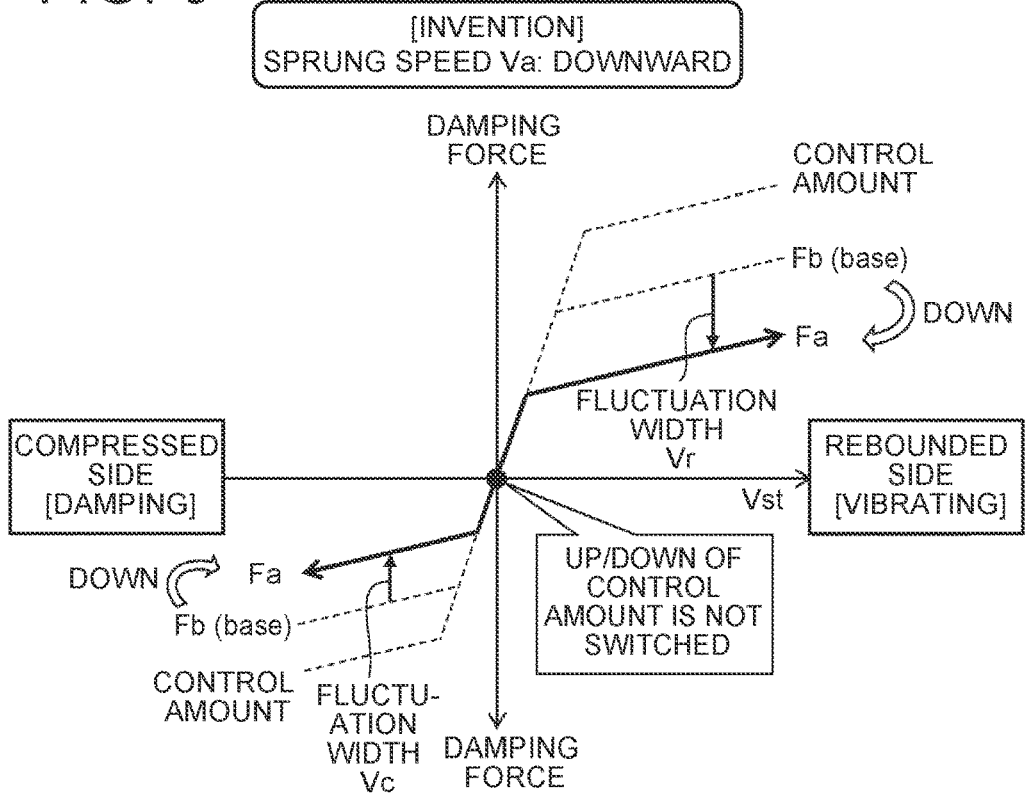
FIG. 9 is a conceptual graph illustrating the control amount correction process according to the embodiment of the disclosure.

FIG. 8 and FIG. 9 each show the control amount correction process according to this embodiment in the same format as FIG. 3.

FIG. 8 shows the case where the sprung speed Va is in the upward direction (Va>0). According to this embodiment, in the case where the sprung speed Va is in the upward direction, the control amount Fa is corrected to be increased from the base control amount Fb (CONTROL AMOUNT UP) regardless of the stroke speed Vst. In other words, the control amount correction process is executed such that the damping force becomes larger than the base damping force regardless of the stroke speed Vst. Even when the stroke speed Vst is reversed between the rebounded side and the compressed side, the increase/reduction (UP/DOWN) of the control amount Fa is not switched.

As shown in FIG. 8, the fluctuation width (increase width) of the damping force from the base damping force is "Vr" when the stroke speed Vst is on the rebounded side, and is "Vc" when the stroke speed Vst is on the compressed side. In the case where the fluctuation width (the sensitivity) of the damping force with respect to the fluctuation of the control amount Fa is greater on the rebounded side than on the compressed side, the fluctuation width Vr on the rebounded side is greater than the fluctuation width Vc on the compressed side.

As described above, in the cases where the sprung speed Va is in the upward direction (Va>0) and the stroke speed Vst is on the rebounded side (Vst>0), the "damping effect"

to suppress the vertical vibrations of the sprung structure 4 is exerted. Accordingly, the damping effect is further promoted by increasing the control amount Fa from the base control amount Fb.

Meanwhile, in the cases where the sprung speed Va is in the upward direction (Va>0) and the stroke speed Vst is on the compressed side (Vst<0), the "vibrating effect" to promote the vertical vibrations of the sprung structure 4 is exerted. Accordingly, the vibrating effect is promoted when the control amount Fa is increased from the base control amount Fb. However, since the fluctuation width Vr of the damping force on the rebounded side is greater than the fluctuation width Vc of the damping force on the compressed side, promotion width of the damping effect on the rebounded side is greater than promotion width of the vibrating effect on the compressed side. Thus, on average, the damping effect is promoted, and the vibrating effect is suppressed.

FIG. 9 shows the case where the sprung speed Va is in the downward direction (Va<0). According to this embodiment, in the case where the sprung speed Va is in the downward direction, the control amount Fa is corrected to be reduced from the base control amount Fb (CONTROL AMOUNT DOWN) regardless of the stroke speed Vst. In other words, the control amount correction process is executed such that the damping force becomes smaller than the base damping force regardless of the stroke speed Vst. Even when the stroke speed Vst is reversed between the rebounded side and the compressed side, the increase/reduction (UP/DOWN) of the control amount Fa is not switched.

As shown in FIG. 9, the fluctuation width (reduction width) of the damping force from the base damping force is "Vr" when the stroke speed Vst is on the rebounded side, and is "Vc" when the stroke speed Vst is on the compressed side. In the case where the fluctuation width (the sensitivity) of the damping force with respect to the fluctuation of the control amount Fa is greater on the rebounded side than on the compressed side, the fluctuation width Vr on the rebounded side is greater than the fluctuation width Vc on the compressed side.

As described above, in the cases where the sprung speed Va is in the downward direction (Va<0) and the stroke speed Vst is on the rebounded side (Vst>0), the "vibrating effect" to promote the vertical vibrations of the sprung structure 4 is exerted. Accordingly, the vibrating effect is suppressed by reducing the control amount Fa from the base control amount Fb.

Meanwhile, in the cases where the sprung speed Va is in the downward direction (Va<0) and the stroke speed Vst is on the compressed side (Vst<0), the "damping effect" to suppress the vertical vibrations of the sprung structure 4 is exerted. Accordingly, the damping effect is suppressed when the control amount Fa is reduced from the base control amount Fb. However, since the fluctuation width Vr of the damping force on the rebounded side is greater than the fluctuation width Vc of the damping force on the compressed side, suppression width of the vibrating effect on the rebounded side is greater than suppression width of the damping effect on the compressed side. Thus, on average, the vibrating effect is suppressed, and the damping effect is promoted.

Figure 10:
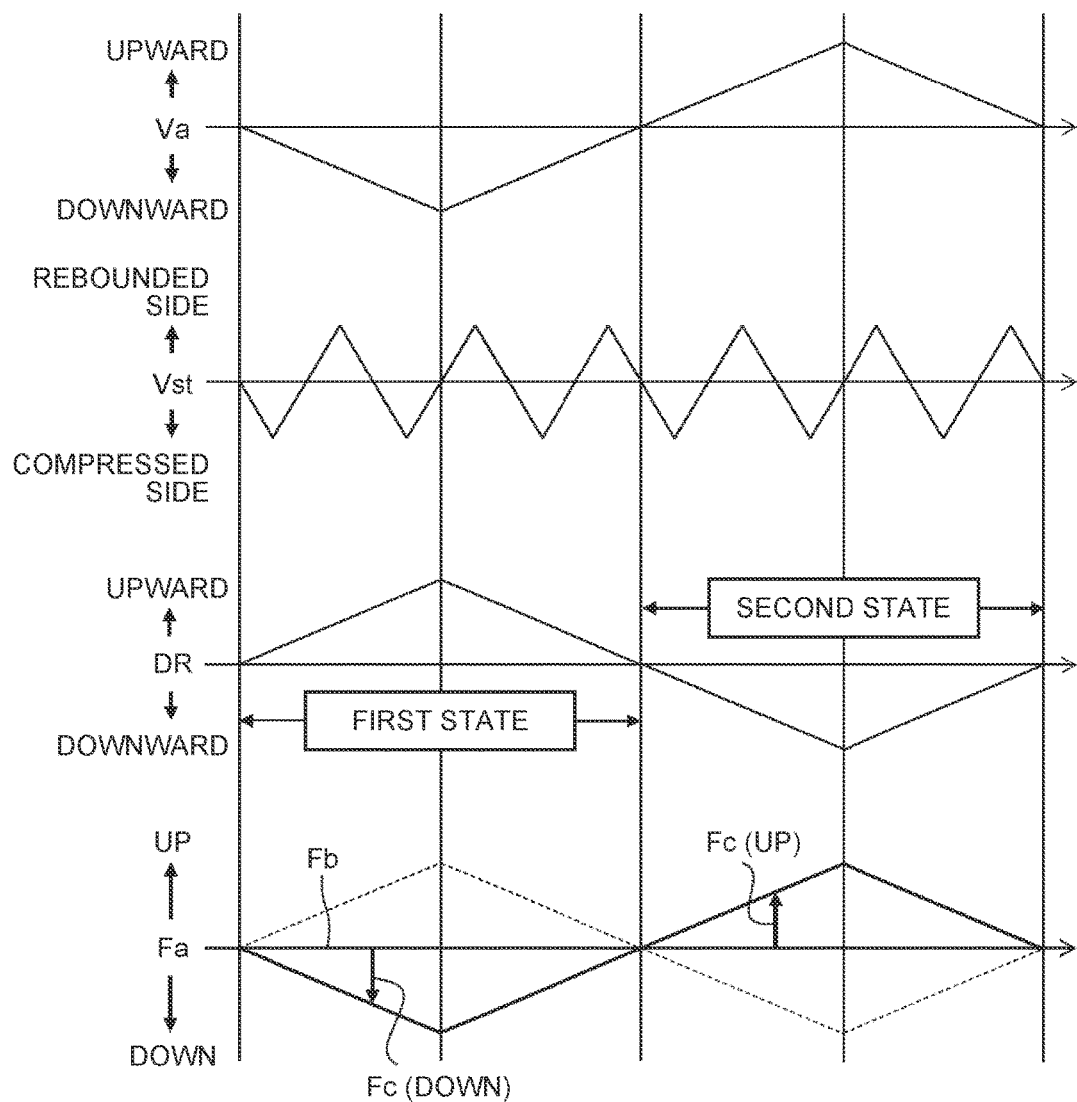
FIG. 10 is a flowchart illustrating the control amount correction process according to the embodiment of the disclosure.

FIG. 10 is a flowchart illustrating the control amount correction process according to this embodiment. FIG. 10 shows an example of the temporal changes of the sprung speed Va, the stroke speed Vst, a requested damping direction DR (will be described below), and the control amount Fa.

In the case where the sprung speed Va is in the downward direction, the control amount Fa is corrected to be reduced from the base control amount Fb (CONTROL AMOUNT DOWN) regardless of the stroke speed Vst. Meanwhile, in the case where the sprung speed Va is in the upward direction, the control amount Fa is corrected to be increased from the base control amount Fb (CONTROL AMOUNT UP) regardless of the stroke speed Vst. A correction amount of the control amount Fa from the base control amount Fb will hereinafter be referred to as a "correction control amount Fc". For example, an absolute value of the correction control amount Fc is increased as the absolute value of the sprung speed Va is increased.

As shown in FIG. 10, even when the stroke speed Vst is reversed between the rebounded side and the compressed side, the increase/reduction (UP/DOWN) of the control amount Fa is not switched. The increase/reduction (UP/DOWN) of the control amount Fa is switched only when the direction of the sprung speed Va is reversed. As conceptually shown in FIG. 10, the sprung speed Va fluctuates at the lower frequency than the stroke speed Vst. According to this embodiment, there is no need to switch the increase/reduction (UP/DOWN) of the control amount Fa at the high frequency that is equivalent to the frequency of the stroke speed Vst. Switching between the increase/reduction (UP/DOWN) of the control amount Fa at the relatively low frequency suffices.

In order to further generalize the control amount correction process according to this embodiment, the "requested damping direction DR" will be considered. The "requested damping direction DR" is a direction of the damping force in the suspension 3 that is requested to suppress the vibrations of the sprung structure 4. As the vibrations of the sprung structure 4 (a vehicle body), rolling vibrations and pitch vibrations are also considered in addition to the vertical vibrations. The requested damping direction DR is the direction of the damping force in the suspension 3 that is requested to suppress at least one type of the vibrations among the vertical vibrations, the rolling vibrations, and the pitch vibrations of the sprung structure 4.

As a typical example, suppression of the vertical vibrations of the sprung structure 4 will be considered. In this case, as shown in FIG. 10, the requested damping direction DR is the downward direction (DR<0) when the sprung speed Va is in the upward direction (Va>0). On the contrary, the requested damping direction DR is the upward direction (DR>0) when the sprung speed Va is in the downward direction (Va<0).

According to this embodiment, in the control amount correction process, whether to increase or reduce the control amount Fa from the base control amount Fb is determined not on the basis of the stroke speed Vst but on the basis of the requested damping direction DR. As shown in FIG. 10, in the case of a "first state" where the requested damping direction DR is the upward direction, the control amount Fa is corrected to be reduced from the base control amount Fb (CONTROL AMOUNT DOWN) regardless of the stroke speed Vst. On the other hand, in the case of a "second state" where the requested damping direction DR is the downward direction, the control amount Fa is corrected to be increased from the base control amount Fb (CONTROL AMOUNT UP) regardless of the stroke speed Vst.

Effects

As it has been described so far, according to this embodiment, the stroke speed Vst is not taken into consideration in the control amount correction process of increasing or reducing the control amount Fa from the base control amount Fb. The control amount correction process is executed not on the basis of the stroke speed Vst but on the basis of the requested damping direction DR. Accordingly, there is no need to switch the increase/reduction (UP/DOWN) of the control amount Fa when the stroke speed Vst is reversed between the rebounded side and the compressed side. The increase/reduction (UP/DOWN) of the control amount Fa is switched only when the requested damping direction DR is reversed.

The requested damping direction DR fluctuates at a lower frequency than the stroke speed Vst (see FIG. 10). According to this embodiment, there is no need to switch the increase/reduction (UP/DOWN) of the control amount Fa at the high frequency that is equivalent to the frequency of the stroke speed Vst. Switching between the increase/reduction (UP/DOWN) of the control amount Fa at the relatively low frequency suffices. In other words, the control amount correction process according to this embodiment is less likely to be affected by the response performance of the actuator for changing the damping force of the shock absorber 3A. Thus, in the control amount correction process according to this embodiment, the control delay of the damping force control is less likely to occur.

In addition, since the stroke speed Vst is not taken into consideration in the control amount correction process, there is no need to estimate the stroke speed Vst. As described in Patent Literature 2 (JP 2016-002844 A), the complicated process is generally required to estimate the stroke speed Vst, and thus significantly long calculation duration and a significant calculation load are required for the estimation process. However, since such a complicated estimation process is unnecessary in this embodiment, a speed of the control amount correction process is improved. This also contributes to reduction of the control delay. Furthermore, since the estimation process of the stroke speed Vst is unnecessary, a system configuration can be simplified.

As it has been described so far, according to this embodiment, the control delay of the damping force control is less likely to occur. Thus, the damping force control can be executed as desired. This contributes to improved reliability of the system.

A suspension control system according to this embodiment is configured on the basis of the perspectives that have been described so far. Hereinafter, the suspension control system according to this embodiment will be described in detail.

Figure 11:
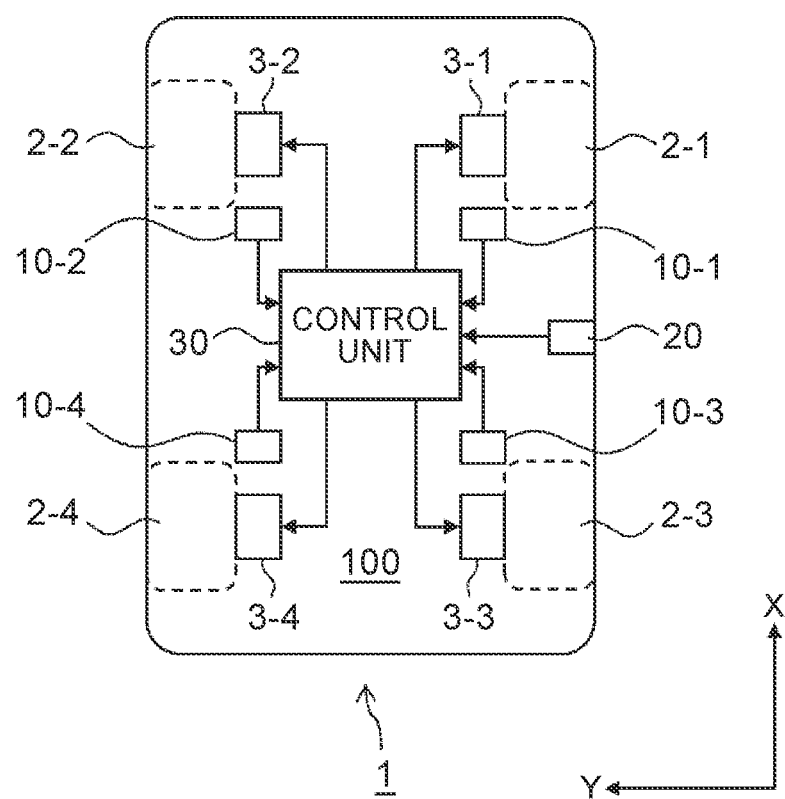
FIG. 11 is a block diagram illustrating a configuration example of a suspension control system according to the embodiment of the disclosure.

Configuration Example FIG. 11 is a block diagram of a configuration example of a suspension control system 100 according to this embodiment. The suspension control system 100 is mounted on the vehicle 1 and controls the damping force of the suspension 3 to be variable. This suspension control system 100 includes the suspensions 3, sprung acceleration sensors 10, a vehicle speed sensor 20, and a control unit 30.

The suspensions 3 is provided for each of the wheels 2. More specifically, the first suspension 3-1, the second suspension 3-2, the third suspension 3-3, and the fourth suspension 3-4 are respectively provided for the right-front wheel 2-1, the left-front wheel 2-2, the right-rear wheel 2-3, and the left-rear wheel 2-4. As described above, the damping force of each of the suspensions 3 can be controlled and fluctuates in accordance with the control amount Fa.

The sprung acceleration sensor 10 is installed in the sprung structure 4 and detects vertical acceleration of the sprung structure 4. The vertical acceleration of the sprung structure 4 will hereinafter be referred to as "sprung acceleration". In the example shown in FIG. 11, four sprung acceleration sensors 10-1 to 10-4 are provided. In detail, the first sprung acceleration sensor 10-1 detects the sprung acceleration of the right-front wheel 2-1 at a first position when seen from a sprung gravity center position (a gravity center position of the sprung structure 4). The second sprung acceleration sensor 10-2 detects the sprung acceleration of the left-front wheel 2-2 at a second position when seen from the sprung gravity center position. The third sprung acceleration sensor 10-3 detects the sprung acceleration of the right-rear wheel 2-3 at a third position when seen from the sprung gravity center position. The fourth sprung acceleration sensor 10-4 detects the sprung acceleration of the left-rear wheel 2-4 at a fourth position when seen from the sprung gravity center position. Note that a distance from the sprung gravity center position to each of the first to fourth positions can be set to any value. Each of the sprung acceleration sensors $10\text{-}i$ ($i=1$ to 4) sends information on the detected sprung acceleration to the control unit 30.

The vehicle speed sensor 20 detects a vehicle speed that is the speed of the vehicle 1. The vehicle speed sensor 20 sends information on the detected vehicle speed to the control unit 30.

The control unit 30 executes the damping force control for controlling the damping force of each of the suspensions $3\text{-}i$ ($i=1$ to 4). More specifically, the control unit 30 receives the detected information on the sprung acceleration and the vehicle speed from the sprung acceleration sensors 10 and the vehicle speed sensor 20. Based on the detected information, the control unit 30 determines a control amount $Fa_i$ for each of the suspensions $3\text{-}i$. Then, the control unit 30 controls the damping force of each of the suspensions $3\text{-}i$ in accordance with the control amount $Fa_i$.

Typically, the control unit 30 is a microcomputer that includes a processor, memory, and input/output interfaces. The control unit 30 is also referred to as an electronic control unit (ECU). The memory stores a control program that can be executed by the processor. When the processor executes the control program, functions of the control unit 30 are realized. Hereinafter, a damping force control process according to this embodiment will be described.

Damping Force Control Process

Figure 12:
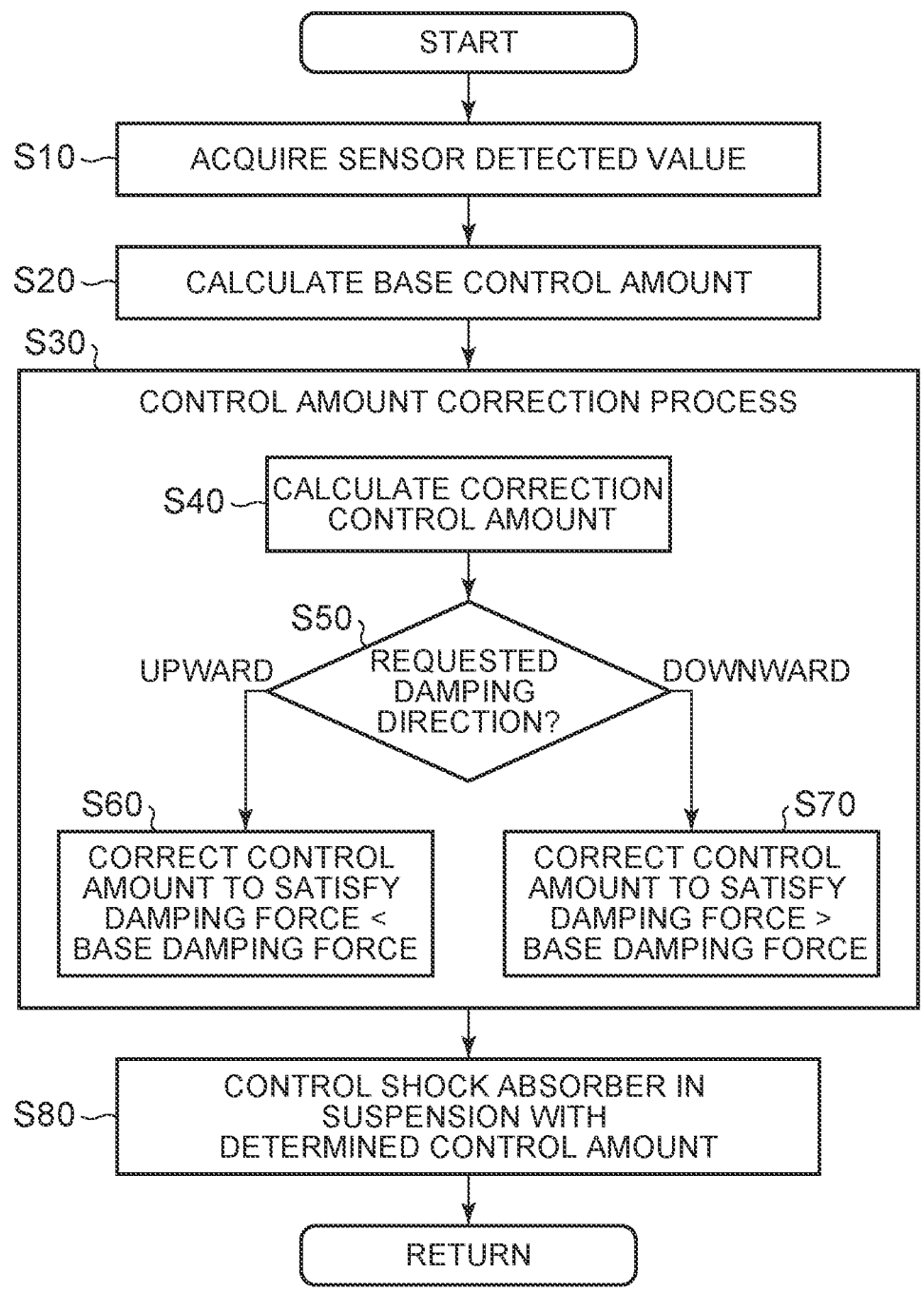
FIG. 12 is a flowchart of a damping force control process that is executed by the suspension control system according to the embodiment of the disclosure.

FIG. 12 is a flowchart of the damping force control process that is executed by the suspension control system 100 (the control unit 30) according to this embodiment. A process flow shown in FIG. 12 is repeatedly executed in constant cycles.

Step S10

The control unit 30 acquires information on a detected value of the sprung acceleration from each of the sprung acceleration sensors $10\text{-}i$ ($i=1$ to 4). The control unit 30 also acquires information on a detected value of the vehicle speed from the vehicle speed sensor 20.

Step S20

The control unit 30 executes a base calculation process of calculating the base control amount Fb that is a base value of each of the control amounts $Fa_i$. For example, the base control amount Fb depends on the vehicle speed, and is increased as the vehicle speed is increased. The control unit 30 refers to a map or the like that is prepared in advance, and calculates the base control amount Fb that corresponds to the vehicle speed. The damping force that corresponds to this base control amount Fb is the base damping force.

Step S30

The control unit 30 executes the above control amount correction process. That is, the control unit 30 determines the control amount $Fa_i$ for each of the suspensions $3\text{-}i$ ($i=1$ to 4) by adding the correction value to the base control amount Fb or subtracting the correction value from the base control amount Fb. The correction amount from the base control amount Fb for each of the suspensions 3-$i$ is a correction control amount Fc$_i$. That is, the correction control amount Fa$_i$ is expressed by a combination of the base control amount Fb and the correction control amount Fc$_i$. The control unit 30 determines the final control amount Fa$_i$ by combining the base control amount Fb and the correction control amount Fc$_i$. In detail, step S30 includes following steps S40 to S70.

Step S40

The control unit 30 calculates the correction control amount Fc$_i$ for each of the suspensions 3-$i$ (i=1 to 4). The correction control amount Fc$_i$ corresponds to a requested control amount that is requested to each of the suspensions 3-$i$ so as to suppress the vibrations of the sprung structure 4. The vibrations of the sprung structure 4 are at least one type of the vibrations among the vertical vibrations, the rolling vibrations, and the pitch vibrations. An algorithm that suppresses the vibrations of the sprung structure 4 is based on the Skyhook damper control theory, for example. Based on the sprung acceleration acquired in step S10, the control unit 30 calculates the requested control amount, which is requested to suppress the vibrations of the sprung structure 4, as the correction control amount Fc$_i$.

For example, the suppression of the vertical vibrations of the sprung structure 4 will be considered. In this case, based on the sprung acceleration acquired in step S10, the control unit 30 calculates a sprung speed Va$_i$ at a position of each of the wheels 2-$i$. Then, by multiplying the sprung speed Va$_i$ by a control gain, the control unit 30 calculates the requested control amount, which is requested to each of the suspensions 3-$i$, that is, the correction control amount Fc$_i$. In this case, an absolute value of the correction control amount Fc$_i$ is increased as an absolute value of the sprung speed Va$_i$ is increased.

Step S50

The control unit 30 determines whether a requested damping direction DR$_i$ of each of the suspensions 3-$i$ (i=1 to 4) is the upward direction or the downward direction. The requested damping direction DR$_i$ is a direction of the damping force in each of the suspensions 3-$i$ that is requested to suppress the vibrations of the sprung structure 4. The vibrations of the sprung structure 4 are at least one type of the vibrations among the vertical vibrations, the rolling vibrations, and the pitch vibrations. The algorithm that suppresses the vibrations of the sprung structure 4 is based on the Skyhook damper control theory, for example. Based on the sprung acceleration acquired in step S10, the control unit 30 determines whether the requested damping direction DR$_i$ is the upward direction or the downward direction.

For example, the suppression of the vertical vibrations of the sprung structure 4 will be considered. In this case, based on the sprung acceleration acquired in step S10, the control unit 30 calculates the sprung speed Va$_i$ at the position of each of the wheels 2-$i$. In the case where the sprung speed Va$_i$ is in the upward direction, the requested damping direction DR$_i$ is the downward direction. On the contrary, in the case where the sprung speed Va$_i$ is the downward direction, the requested damping direction DR$_i$ is in the upward direction.

In the case of the first state where the requested damping direction DR$_i$ is the upward direction, the process proceeds to step S60. On the other hand, in the case of the second state where the requested damping direction DR$_i$ is the downward direction, the process proceeds to step S70.

Step S60

Regardless of the stroke speed Vst, the control unit 30 reduces the control amount Fa$_i$ from the base control amount Fb by the correction control amount Fc$_i$ (CONTROL AMOUNT DOWN). In this way, the damping force that corresponds to the control amount Fa$_i$ becomes smaller than the base damping force that corresponds to the base control amount Fb. That is, the control unit 30 executes the control amount correction process such that the damping force becomes smaller than the base damping force regardless of the stroke speed Vst.

Step S70

Regardless of the stroke speed Vst, the control unit 30 increases the control amount Fa$_i$ from the base control amount Fb by the correction control amount Fc$_i$ (CONTROL AMOUNT UP). In this way, the damping force that corresponds to the control amount Fa$_i$ becomes larger than the base damping force that corresponds to the base control amount Fb. That is, the control unit 30 executes the control amount correction process such that the damping force becomes larger than the base damping force regardless of the stroke speed Vst.

Step S80

The control unit 30 controls the damping force of each of the suspensions 3-$i$ in accordance with each of the control amounts Fa$_i$ acquired in the control amount correction process (step S30). That is, the control unit 30 actuates the actuator of the shock absorber 3A in each of the suspensions 3-$i$ in accordance with the control amount Fa$_i$. In this way, the desired damping force for each of the suspensions 3-$i$ is acquired.

Specific Example of Control Amount Correction Process (Step S30)

Figure 13:
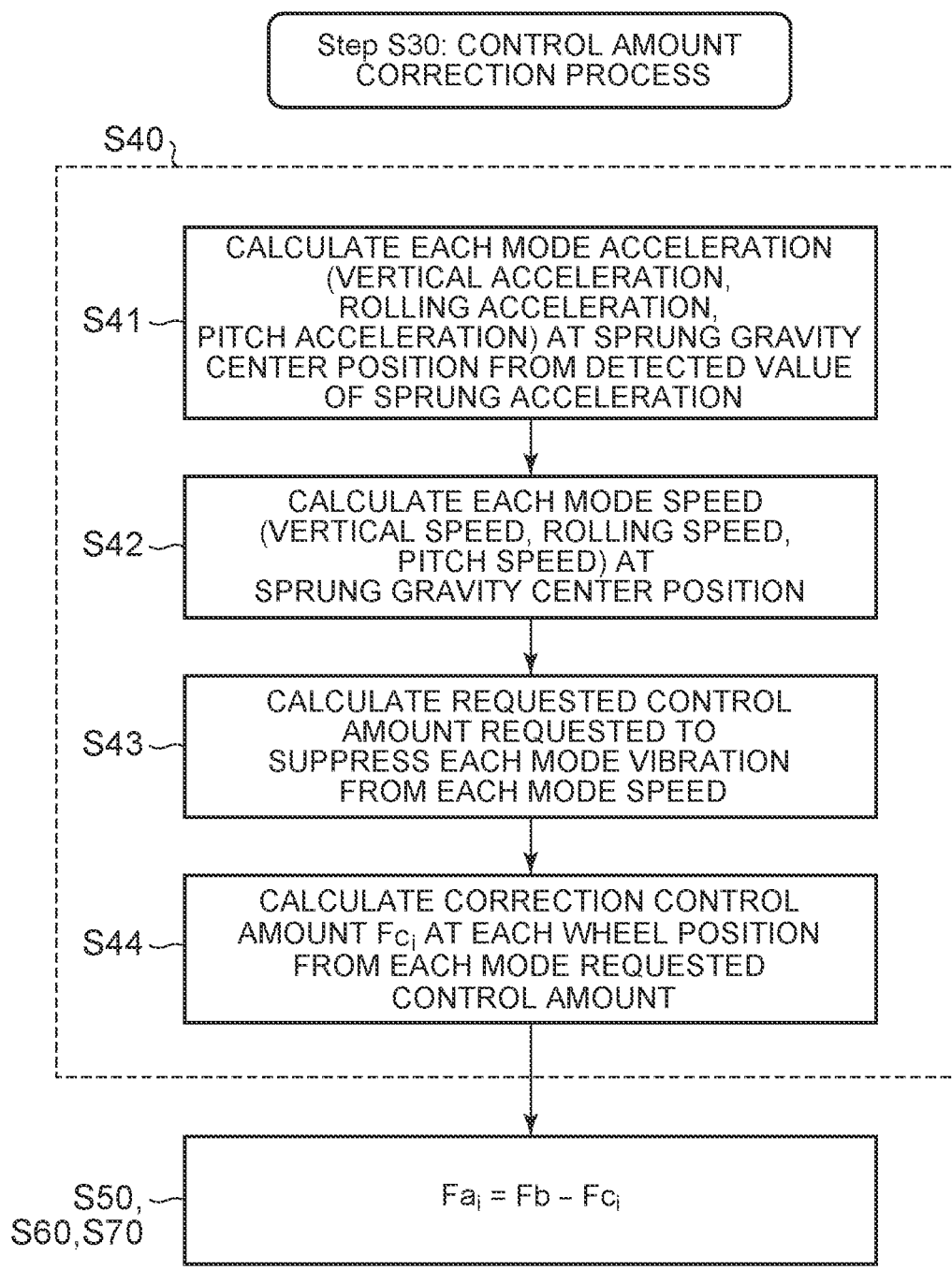
FIG. 13 is a flowchart of a specific example of the control amount correction process according to the embodiment of the disclosure.

FIG. 13 is a flowchart of a specific example of the control amount correction process (step S30) according to this embodiment. As described above, step S30 includes steps S40 to S70. In the example shown in FIG. 13, step S40 of calculating the correction control amount Fc$_i$ includes following steps S41 to S44.

Step S41

Figure 14:
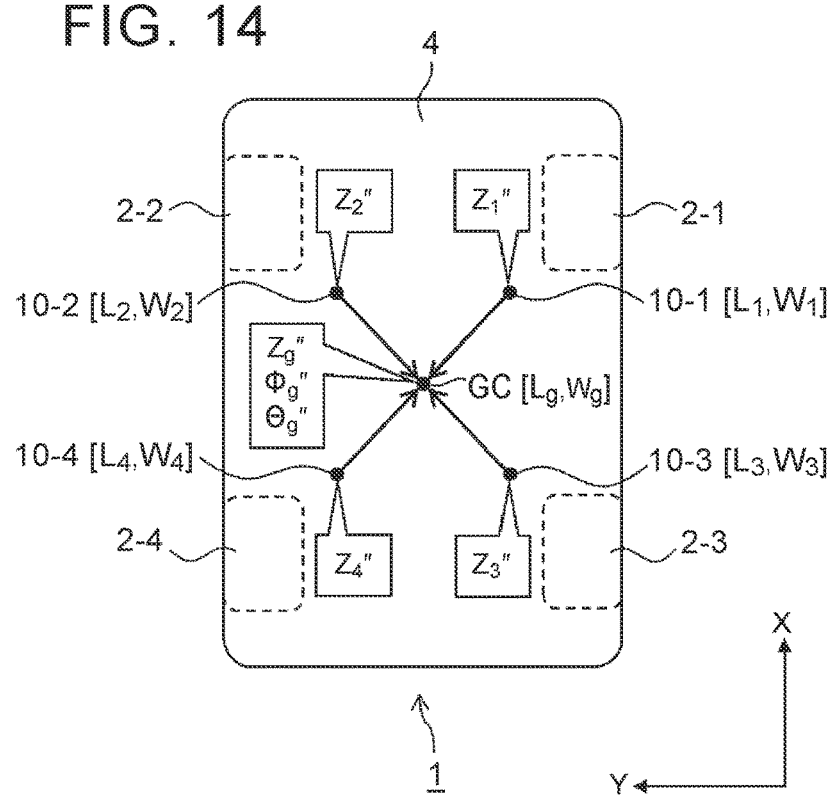
FIG. 14 is a conceptual view illustrating step S41 of the control amount correction process according to the embodiment of the disclosure.

FIG. 14 is a conceptual view illustrating step S41. An X-direction is an advancing direction of the vehicle 1. A Y-direction is a horizontal direction of the vehicle 1 and is orthogonal to the X-direction. The Z-direction is orthogonal to the X-direction and the Y-direction. Positions of the i-th sprung acceleration sensor 10-$i$ (i=1 to 4) in the X-direction and the Y-direction are L$_i$ and W$_i$. Positions of a sprung gravity center position GC in the X-direction and the Y-direction are L$_g$ and W$_g$. These parameters (L$_i$, W$_i$, L$_g$, W$_g$) are acquired in advance and stored in the memory of the control unit 30.

The detected value of the sprung acceleration that is detected by the i-th sprung acceleration sensor 10-$i$ (i=1 to 4) will hereinafter be referred to as detected acceleration Z$_i$". The control unit 30 calculates each mode acceleration at the sprung gravity center position GC (that is, vertical acceleration Z$_g$", roll acceleration $\Phi_g$", and pitch acceleration $\Theta_g$") from the detected acceleration Z$_1$" to Z$_4$" detected by the four sprung acceleration sensors 10-1 to 10-4. For example, the control unit 30 calculates the vertical acceleration Z$_g$", the roll acceleration $\Phi_g$", and the pitch acceleration $\Theta_g$" in accordance with the following equations (1) to (4).

$$M = \begin{bmatrix} L_1 W_1 & L_1 & W_1 & 1 \\ L_2 W_2 & L_2 & W_2 & 1 \\ L_3 W_3 & L_3 & W_3 & 1 \\ L_4 W_4 & L_4 & W_4 & 1 \end{bmatrix}^{-1} \quad (1)$$

-continued $$Z_g'' = \sum_{i=1}^{4} \{M(2,i)L_g + M(4,i)\}Z_i'' \quad (2)$$

$$\Phi_g'' = -\sum_{i=1}^{4} \{M(1,i)L_g + M(3,i)\}Z_i'' \quad (3)$$

$$\Theta_g'' = \sum_{i=1}^{4} M(2,i)Z_i'' \quad (4)$$

By using the detected acceleration $Z_1''$ to $Z_4''$ at the four positions, the vertical acceleration $Z_g''$, the roll acceleration $\Phi_g''$, and the pitch acceleration $\Theta_g''$ at the sprung gravity center position GC can be calculated accurately.

However, the method of calculating the vertical acceleration $Z_g''$, the roll acceleration $\Phi_g''$, and the pitch acceleration $\Theta_g''$ at the sprung gravity center position GC is not limited to what has been described above. For example, only the three sprung acceleration sensors 10 may be used.

Step S42

Next, the control unit 30 calculates each mode speed (a vertical speed $Z_g'$, a rolling speed $\Phi_g'$, and a pitch speed $\Theta_g'$) at the sprung gravity center position GC by integrating the each mode acceleration (the vertical acceleration $Z_g''$, the roll acceleration $\Phi_g''$, and the pitch acceleration $\Theta_g''$). The vertical speed $Z_g'$, the rolling speed $\Phi_g'$, and the pitch speed $\Theta_g'$ at the sprung gravity center position GC are expressed by the following equations (5) to (7), respectively.

$$Z_g' = \int Z_g'' \quad (5)$$

$$\Phi_g' = \int \Phi_g'' \quad (6)$$

$$\Theta_g' = \int \Theta_g'' \quad (7)$$

Step S43

Next, the control unit 30 calculates the requested control amount that is requested to suppress each mode vibration (the vertical vibration, the rolling vibration, and the pitch vibration) at the sprung gravity center position GC. The requested control amount includes: a requested vertical control amount $F_z$ to suppress the vertical vibrations; a requested rolling control amount $M_r$ to suppress the rolling vibrations; and a requested pitch control amount $M_p$ to suppress the pitch vibrations. Here, the requested vertical control amount $F_z$ has a positive value in the case where the damping force in the upward direction is requested. The requested rolling control amount $M_r$ has a positive value in the case where damping moment in a downward direction to the right and an upward direction to the left is requested. The requested pitch control amount $M_p$ has a positive value in the case where the damping moment with the lowered front wheels and the raised rear wheels is requested.

The control unit 30 calculates these requested vertical control amount $F_z$, requested rolling control amount $M_r$, and requested pitch control amount $M_p$ from the vertical speed $Z_g'$, the rolling speed $\Phi_g'$, and the pitch speed $\Theta_g'$ that are acquired in above step S42. For example, the requested vertical control amount $F_z$, the requested rolling control amount $M_r$, and the requested pitch control amount $M_p$ are acquired from the following equations (8) to (10), respectively.

$$F_z = G_z Z_g' \quad (8)$$

$$M_r = G_r \Phi_g' \quad (9)$$

$$M_p = G_p \Theta_g' \quad (10)$$

In the equations (8) to (10), $G_z$, $G_r$, and $G_p$ are control gains. These control gains $G_z$, $G_r$, and $G_p$ are linear gains according to the Skyhook damper control theory, for example. The control unit 30 can calculate each of the requested control amounts at the sprung gravity center position GC by multiplying each of the mode speeds at the sprung gravity center position GC by the control gain. Alternatively, the control unit 30 may calculate each of the requested control amounts by referring to a map that is based on each of the mode speeds.

Step S44

Next, the control unit 30 converts the requested control amounts ($F_z$, $M_r$, $M_p$) at the sprung gravity center position GC to the requested control amounts at the position of each of the wheels 2-i. The requested control amounts at the position of each of the wheels 2-i correspond to the correction control amounts $Fc_i$ that are requested for each of the suspensions 3-i.

Figure 15:
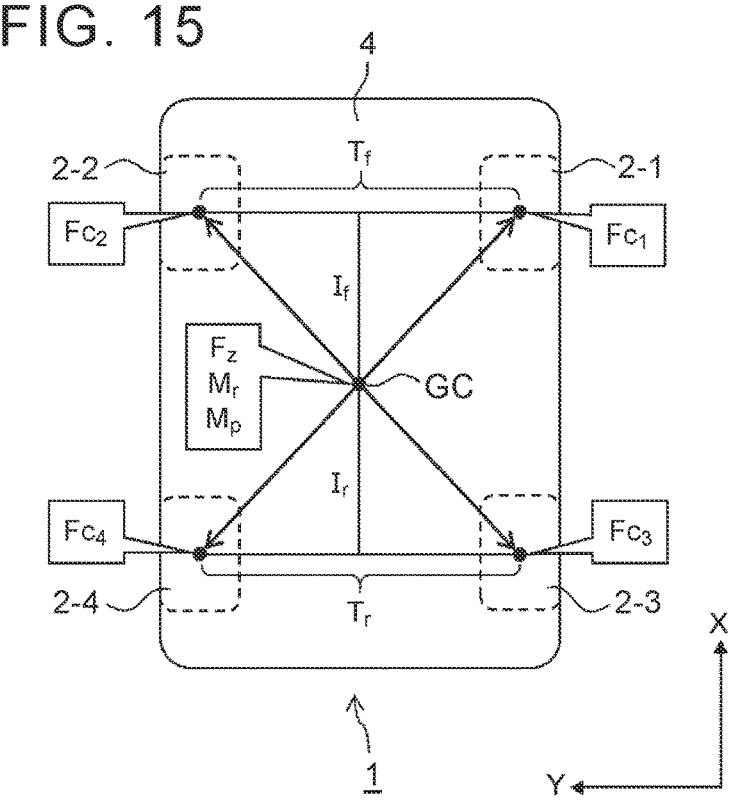
FIG. 15 is a conceptual view illustrating step S44 of the control amount correction process according to the embodiment of the disclosure.

FIG. 15 is a conceptual view illustrating step S44. Tread width of each of the front wheels (2-1, 2-2) is $T_f$, and tread width of each of the rear wheels (2-3, 2-4) is $T_r$. A distance between a front wheel axis and the sprung gravity center position GC is $l_f$, and a distance between a rear wheel axis and the sprung gravity center position GC is $l_r$. In this case, the correction control amount $Fc_i$ requested for each of the suspensions 3-i is expressed by the following equation (11).

$$\begin{bmatrix} Fc_1 \\ Fc_2 \\ Fc_3 \\ Fc_4 \end{bmatrix} = \begin{bmatrix} \dfrac{l_r}{2(l_f+l_r)} & -\dfrac{1}{2T_f} & -\dfrac{1}{4l_f} \\ \dfrac{l_r}{2(l_f+l_r)} & \dfrac{1}{2T_f} & -\dfrac{1}{4l_f} \\ \dfrac{l_f}{2(l_f+l_r)} & -\dfrac{1}{2T_r} & \dfrac{1}{4l_r} \\ \dfrac{l_f}{2(l_f+l_r)} & \dfrac{1}{2T_r} & \dfrac{1}{4l_r} \end{bmatrix} \begin{bmatrix} F_z \\ M_r \\ M_p \end{bmatrix} \quad (11)$$

In accordance with this equation (11), the control unit 30 can convert the requested control amounts ($F_z$, $M_r$, $M_p$) at the sprung gravity center position GC to the correction control amount $Fc_i$ for each of the suspensions 3-i. Alternatively, the control unit 30 may calculate each of the correction control amounts $Fc_i$ by referring to a map that is based on the requested control amounts ($F_z$, $M_r$, $M_p$).

Steps S50 to S70

The sign of the correction control amount $Fc_i$ acquired by the above equation (11) matches the sign (orientation) of the requested damping direction $DR_i$. More specifically, in the case where the requested damping direction $DR_i$ is the upward direction ($DR_i>0$), the correction control amount $Fc_i$ has the positive sign ($Fc_i>0$). Meanwhile, in the case where the requested damping direction $DR_i$ is the downward direction ($DR_i<0$), the correction control amount $Fc_i$ has the negative sign ($Fc_i<0$). In this case, the control amount $Fa_i$ is expressed by the following equation (12).

$$Fa_i = Fb_i - Fc_i \quad (12)$$

In the case where the requested damping direction $DR_i$ is the upward direction, the correction control amount $Fc_i$ has the positive value. Thus, the control amount $Fa_i$ becomes smaller than the base control amount Fb (step S60). On the other hand, in the case where the requested damping direction $DR_i$ is the downward direction, the correction control amount $Fc_i$ has the negative value. Thus, the control amount $Fa_i$ becomes larger than the base control amount Fb (step S70). Just as described, steps S50 to S70 can collectively be executed only by the equation (12).

More generally, in the case where the sign of the correction control amount $Fc_i$ differs in accordance with whether the requested damping direction $DR_i$ is the upward direction or the downward direction, steps S50 to S70 can collectively be executed by using such a correction control amount $Fc_i$. That is, by combining the base control amount Fb and the correction control amount $Fc_i$, the control unit 30 can execute the control amount correction process without determining whether the requested damping direction $DR_i$ is the upward direction or the downward direction. In this way, the control amount correction process is simplified and thus is preferred.

What is claimed is:

1. A suspension control system mounted on a vehicle, the suspension control system comprising:
   a suspension provided for a wheel of the vehicle and a damping force of which fluctuates in accordance with a control amount; and
   a control unit configured to determine the control amount and control the damping force, wherein
   the control unit is configured to execute a base calculation process of calculating a base control amount that is a base value of the control amount and a control amount correction process of determining the control amount by combining the base control amount and a correction control amount,
   a base damping force is the damping force that corresponds to the base control amount,
   a stroke speed is a relative speed between a sprung structure and an unsprung structure that are mutually coupled via the suspension,
   a requested damping direction is a direction of the damping force that is requested to suppress vibrations of the sprung structure, and
   the control unit is configured to execute the control amount correction process such that the damping force becomes smaller than the base damping force regardless of the stroke speed in the case where the requested damping direction is an upward direction and to execute the control amount correction process such that the damping force becomes larger than the base damping force regardless of the stroke speed in the case where the requested damping direction is a downward direction.

2. The suspension control system according to claim 1, wherein when a compressed side and a rebounded side of the stroke speed are compared, fluctuation width of the damping force with respect to a fluctuation of the control amount is greater on the rebounded side than on the compressed side.

3. The suspension control system according to claim 1, wherein:
   a sprung speed is a vertical speed of the sprung structure; and
   the requested damping direction is the downward direction in the case where the sprung speed is in the upward direction, and the requested damping direction is the upward direction in the case where the sprung speed is in the downward direction.

4. The suspension control system according to claim 1 further comprising a sprung acceleration sensor detecting vertical acceleration of the sprung structure, wherein the control unit is configured to calculate a requested control amount that is requested to suppress the vibrations of the sprung structure as the correction control amount on the basis of the vertical acceleration detected by the sprung acceleration sensor.

5. The suspension control system according to claim 4, wherein:
   a sign of the correction control amount differs by whether the requested damping direction is the upward direction or the downward direction; and
   the control unit is configured to execute the control amount correction process by combining the correction control amount and the base control amount without determining whether the requested damping direction is the upward direction or the downward direction.

6. The suspension control system according to claim 1 further comprising a sprung acceleration sensor detecting vertical acceleration of the sprung structure, wherein the control unit is configured to determine whether the requested damping direction is the upward direction or the downward direction on the basis of the vertical acceleration detected by the sprung acceleration sensor.

* * * * *